(12) United States Patent
Nobuoka et al.

(10) Patent No.: US 11,587,031 B2
(45) Date of Patent: Feb. 21, 2023

(54) MANAGEMENT DEVICE AND MANAGEMENT SYSTEM

(71) Applicant: TOSHIBA TEC KABUSHIKI KAISHA, Tokyo (JP)

(72) Inventors: Tetsuya Nobuoka, Mishima (JP); Yuishi Takeno, Numazu (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 288 days.

(21) Appl. No.: 17/091,150

(22) Filed: Nov. 6, 2020

(65) Prior Publication Data
US 2021/0383312 A1 Dec. 9, 2021

(30) Foreign Application Priority Data

Jun. 4, 2020 (JP) ............................ JP2020-097462

(51) Int. Cl.
| | |
|---|---|
| *G06Q 10/08* | (2012.01) |
| *G06Q 10/087* | (2023.01) |
| *G06Q 30/02* | (2023.01) |
| *G06F 16/55* | (2019.01) |
| *H04N 5/232* | (2006.01) |
| *G06K 9/62* | (2022.01) |
| *H04N 5/38* | (2006.01) |
| *G01S 17/08* | (2006.01) |
| *G06V 20/10* | (2022.01) |

(52) U.S. Cl.
CPC ............ *G06Q 10/087* (2013.01); *G01S 17/08* (2013.01); *G06F 16/55* (2019.01); *G06K 9/6201* (2013.01); *G06Q 30/02* (2013.01); *G06V 20/10* (2022.01); *H04N 5/232* (2013.01); *H04N 5/38* (2013.01)

(58) Field of Classification Search
CPC .......... G06K 9/6201; G06K 9/62; G06K 9/00; G06V 20/10; G06V 20/52; H04N 5/232; H04N 5/38; G01S 17/08; G01S 17/88; G06Q 30/02; G06Q 10/087; G06Q 10/08; G06F 16/55
USPC ........................................................ 705/28
See application file for complete search history.

(56) References Cited

U.S. PATENT DOCUMENTS 9,922,254 B1 * 3/2018 Ho ........................... G06T 7/74
10,789,483 B1 * 9/2020 Ren ..................... G06V 10/758
(Continued)

FOREIGN PATENT DOCUMENTS

JP 2018-206372 12/2018

*Primary Examiner* — Andrew Joseph Rudy
(74) *Attorney, Agent, or Firm* — Foley & Lardner LLP (57) ABSTRACT

A management device includes a distance sensor, a sensor interface, and a processor. The distance sensor is configured to measure a distance between a predetermined position and a backmost side of a commodity line having commodities biased in an arrangement direction and supported from a foremost side of the commodity line. The sensor interface transmits and receives data to and from the distance sensor. The processor calculates a length of the commodity line based on the distance before a change in the distance and the distance after the change in the distance when the distance is changed, and determines whether the length of the commodity line matches a thickness of the commodity indicated by shelf label information. The processor calculates the increased or decreased number of commodities based on the determination.

16 Claims, 6 Drawing Sheets

(56) References Cited

U.S. PATENT DOCUMENTS 11,087,272 B2 * 8/2021 Skaff ................. G06N 3/008
11,288,630 B2 * 3/2022 Tiwari ................ G06V 20/52

* cited by examiner

MANAGEMENT DEVICE AND MANAGEMENT SYSTEM

CROSS-REFERENCE TO RELATED APPLICATION

This application is based upon and claims the benefit of priority from Japanese Patent Application No. 2020-097462, filed on Jun. 4, 2020, the entire contents of which are incorporated herein by reference.

TECHNICAL FIELD

Embodiments described herein relate generally to a management device and a management system.

BACKGROUND

In stores, devices are provided to specify commodities (e.g., articles) extracted from shelves by users through image processing. Such devices count the number of extracted commodities by separating images of the commodities extracted from the shelves by the user through image processing.

In the related art, there is concern that the devices fail to separate images and fail to count the increased or decreased number of commodities.

DETAILED DESCRIPTION

At least one exemplary embodiment provides a management device and a management system capable of efficiently calculating an increase and a decrease in the number of commodities.

In general, according to at least one embodiment, a management device includes a sensor interface and a processor. The sensor interface transmits and receives data to and from a distance sensor that measures a distance between a predetermined position and a backmost side of a commodity line. The commodity line is formed by commodities biased in an arrangement direction and supported from a foremost side of the commodity line. The processor calculates a length of the commodity line based on a difference between the distance before a change in the distance and the distance after a change in the distance, each measured by the distance sensor when the distance is changed. The processor further determines whether a length of the commodity line matches a thickness of the commodity indicated by shelf label information. The processor calculates the increased or decreased number of commodities based on the length of the commodity line when the processor determines that the length of the commodity line matches the thickness of the commodity indicated by the shelf label information.

Hereinafter, at least one embodiment will be described with reference to the drawings. A management system according to the at least one embodiment calculates the number of commodities extracted from a shelf by a user in a store, for instance, or the number of commodities which are added by a user (an operator). The management system is used for a system that automatically adjusts commodities. The management system may calculate the increased or decreased number of commodities in a warehouse, a factory, or the like.

Figure 1:
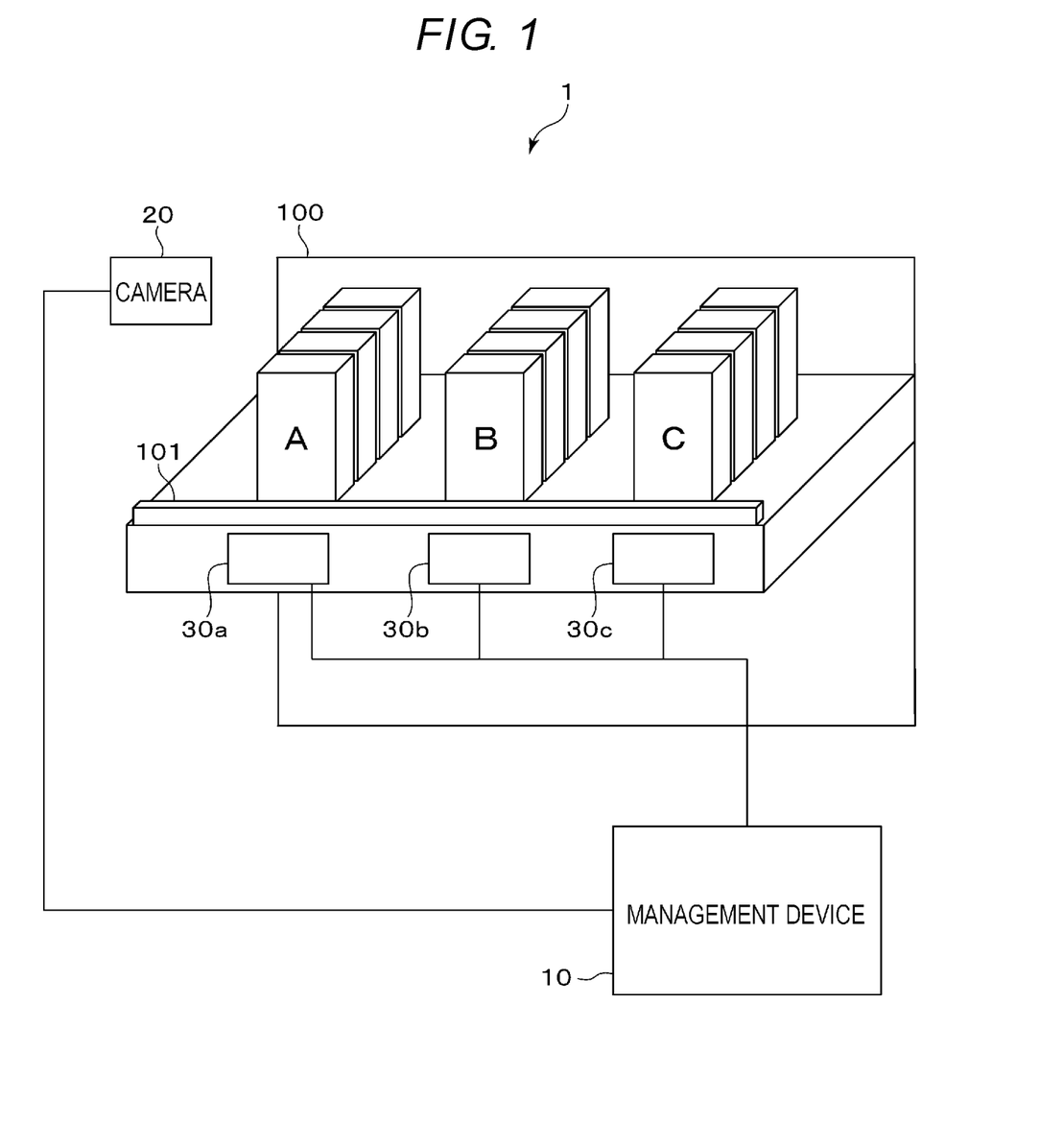
FIG. 1 is a diagram schematically illustrating a configuration of a management system, according to an example embodiment.
Figure 2:
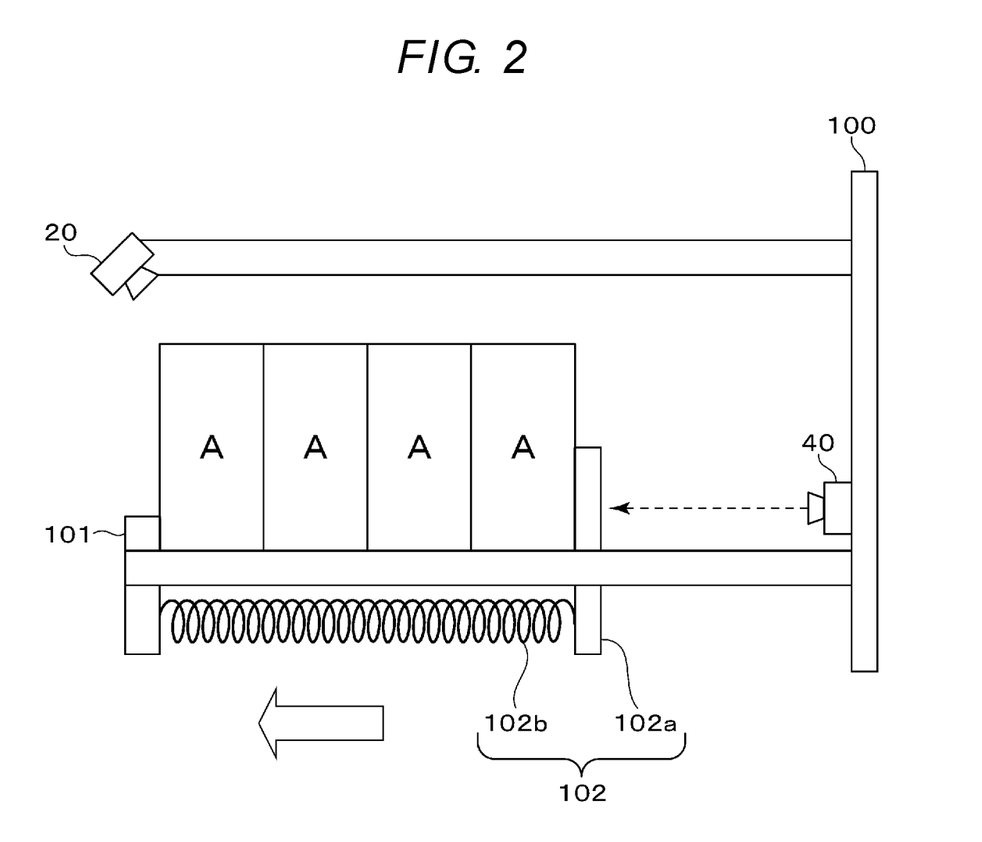
FIG. 2 is a diagram schematically illustrating a cross section of a shelf, according to an example embodiment.

FIG. 1 is a diagram schematically illustrating a configuration example of a management system 1. FIG. 2 is a diagram schematically illustrating a cross section of a shelf 100 included in the management system 1 according to the at least one embodiment. As illustrated in FIGS. 1 and 2, the management system 1 includes the management device 10, a camera 20, electronic shelf labels 30, a distance sensor 40, and a shelf 100.

The management device 10 is connected to the camera 20, the electronic shelf labels 30, and the distance sensor 40. The management system 1 may be configured as illustrated in FIGS. 1 and 2. However, the management device 10 may be in a variety of configurations or various components may be excluded from the management system 1.

Here, the management system 1 calculates the increased or decreased numbers of commodities A, B, and C exhibited on the shelf 100.

The management device 10 calculates the increased or decreased number of commodities exhibited on the shelf 100 based on a sensor signal from the distance sensor 40. The management device 10 will be described later in detail.

The camera 20 captures images of the commodities A, B, and C. Here, the camera 20 captures images of the front side (face) of the commodities A, B, and C located in front. The camera 20 captures images of the commodities A to C under the control of the management device 10. The camera 20 transmits the captured image to the management device 10.

For example, the camera 20 is coupled to a shelf stage formed above the commodities A to C and is angled downward.

The electronic shelf labels 30 display various kinds of information under the control of the management device 10. For example, the electronic shelf labels 30 display names, prices, and the like of the commodities. The electronic shelf labels 30 may display an error indicating that the exhibition of the commodities is wrong.

Here, the electronic shelf labels 30 include electronic shelf labels 30a, 30b, and 30c. Electronic shelf labels 30a, 30b, and 30c correspond to the commodities A, B, and C, respectively.

A support member 101 (e.g., a support mechanism) is formed at the shelf stage of the shelf 100. The support member 101 is formed in a rectangular bar shape. The support member 101 is formed in a predetermined length on the front side of the shelf stage. The support member 101 is configured to be lower than the heights of the commodities A to C.

As will be described below, the commodities A to C are biased (e.g., urged, pressed, moved, forced, etc.) toward the front side. The support member 101 supports the biased commodities A to C from the front side. The support member 101 comes into contact with the lower ends of the commodities A to C to support the commodities A to C.

As illustrated in FIG. 2, an biasing member 102 is formed in the shelf 100. Here, the biasing member 102 that biases (e.g., urges) the commodities A will be described. The biasing member 102 biases the commodities A in a direction in which the commodities A are arranged (e.g., an arrangement direction). The biasing member 102 biases the commodities A in the front direction from the back side of the shelf stage.

The biasing member 102 includes a plate 102a and a spring 102b. The plate 102a is installed to be movable in a depth direction (the arrangement direction of the commodities A) on the shelf stage of the shelf 100.

The spring 102b biases the plate 102a in the front direction from the back side of the plate 102a. One end of the spring 102b is fixed near a front side of the shelf stage and the other end thereof is fixed to the plate 102a. The spring 102b is fixed to the plate 102a and is configured to be extended more than a natural length.

The biasing member 102 urges the plate 102a in the front direction of the shelf stage by a tensile force of the spring 102b. Therefore, the commodities A arranged between the support member 101 and the plate 102a are biased to the front side by the biasing member 102. The distance sensor 40 is installed on the back plate of the shelf 100. The distance sensor 40 measures a distance between the back plate to the backmost side of the commodity line (e.g., the article line) in which the commodities A are formed. That is, the distance sensor 40 measures a distance to the back side of the commodity A disposed on the back-most side (e.g., the commodity A at the end of the line). Here, the distance sensor 40 measures a distance to the plate 102a. The distance sensor 40 transmits the measured distance to the management device 10.

For example, the distance sensor 40 measures a distance based on reflected light of light (visible light or invisible light) radiated from a light source. The distance sensor 40 may use a time-of-flight (ToF) scheme of measuring a distance to a measurement target based on a time until the radiated light is reflected from the measurement target and arrives at an optical sensor. The configuration of the distance sensor 40 is not limited to a specific configuration.

The biasing member 102 and the distance sensor 40 are formed in the shelf 100 for each commodity line. That is, the biasing member 102 and the distance sensor 40 are also formed in the line of the commodities B and the line of the commodities C.

The biasing member 102 may be a member independent from the shelf 100. For example, the biasing member 102 may be placed on the shelf plate. The biasing member 102 is not limited to a specific configuration as long as the biasing member 102 is a mechanism that biases commodities toward the front side.

Figure 3:
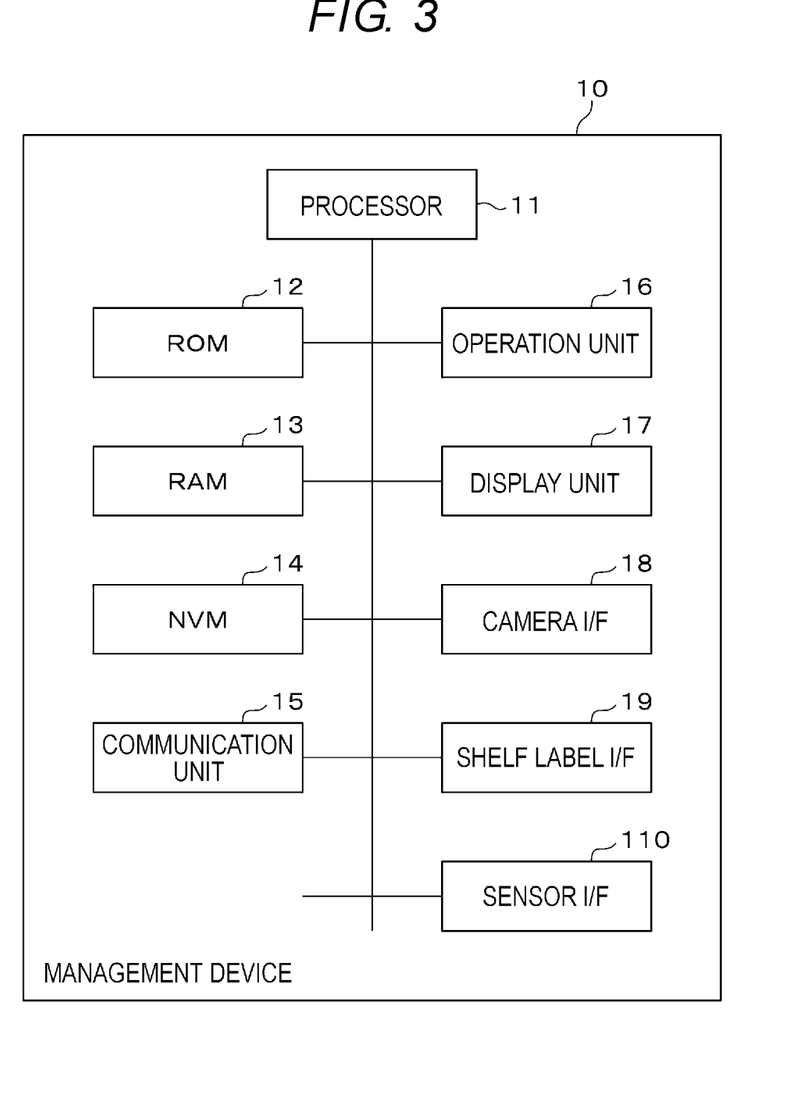
FIG. 3 is a block diagram illustrating a configuration of a management device, according to an example embodiment.

Next, the management device 10 will be described. FIG. 3 is a block diagram illustrating a configuration example of the management device 10. As illustrated in FIG. 3, the management device 10 includes a processor 11, a ROM 12, a RAM 13, an NVM 14, a communication unit 15 (e.g., a communicator), an operation unit 16 (e.g., an operator), a display unit 17 (e.g., a display interface), a camera interface 18, a shelf label interface 19, and a sensor interface 110.

The processor 11, the ROM 12, the RAM 13, the NVM 14, the communication unit 15, the operation unit 16, the display unit 17, the camera interface 18, the shelf label interface 19, and the sensor interface 110 are connected to each other via a data bus or the like. The management device 10 may be configured as illustrated in FIG. 3. However, the management device 10 may be in a variety of configurations or certain components may be excluded from the management device 10.

The processor 11 is configured to control an operation of the entire management device 10. The processor 11 may include an internal cache and various interfaces. The processor 11 implements various processes by executing programs stored in advance in an internal memory, the ROM 12, or the NVM 14.

Some of the various functions implemented by allowing the processor 11 to execute programs may be implemented by hardware circuits. In this case, the processor 11 controls the functions implemented by the hardware circuits.

The ROM 12 is a nonvolatile memory in which a control program, control data, and the like are stored in advance. The control program and the control data stored in the ROM 12 are embedded in advance in accordance with the specification of the management device 10.

The RAM 13 is a volatile memory. The RAM 13 temporarily stores data or the like which is being processed by the processor 11. The RAM 13 stores various application programs in response to commands from the processor 11. The RAM 13 may store data necessary to execute the application programs, execution results of the application programs, and the like.

The NVM 14 is a nonvolatile memory capable of writing and rewriting data. The NVM 14 is configured as, for example, a hard disk drive (HDD), a solid-state drive (SSD), or a flash memory. The NVM 14 stores a control program, applications, and various kinds of data in accordance with operational uses of the management device 10.

The communication unit 15 is an interface that transmits and receives data to and from an external device. For example, the communication unit 15 is an interface that supports connection of a wired or wireless local area network (LAN).

The operation unit 16 receives inputs of various operations from the user. The operation unit 16 transmits a signal indicating an input operation to the processor 11. The operation unit 16 may be configured as a touch panel. The display unit 17 displays image data from the processor 11. For example, the display unit 17 is configured as a liquid crystal monitor. When the operation unit 16 is configured as a touch panel, the display unit 17 may be integrated with the operation unit 16.

The camera interface 18 is an interface that transmits and receives data to and from the camera 20. The camera interface 18 is connected to the camera 20 in a wired or wireless manner. For example, the camera interface 18 transmits a signal for causing the camera 20 to capture an image under the control of the processor 11. The camera interface 18 transmits the image captured by the camera 20 to the processor 11.

The shelf label interface 19 is an interface that transmits and receives data to and from the electronic shelf labels 30. The shelf label interface 19 is connected to the electronic shelf labels 30 in a wired or wireless manner. For example, the shelf label interface 19 transmits a signal for displaying an image to the electronic shelf labels 30 under the control of the processor 11.

The sensor interface 110 is an interface that transmits and receives data to and from the distance sensor 40. The sensor interface 110 is connected to the distance sensor 40 in a wired or wireless manner. For example, the sensor interface 110 transmits a distance measured by the distance sensor 40 to the processor 11.

The camera interface 18, the shelf label interface 19, and the sensor interface 110 may be integrated.

Next, functions of the management device 10 will be described. The functions of the management device 10 are attained by allowing the processor 11 to execute a program stored in an internal memory, the ROM 12, or the NVM 14.

First, the processor 11 has a function of acquiring the number of commodities exhibited on the shelf 100 based on a distance measured by the distance sensor 40.

For example, when the user completes the exhibition of the commodities on the shelf 100, the processor 11 acquires shelf label information. The shelf label information indicates commodities exhibited at each position of the shelf 100.

When the shelf label information is acquired, the processor 11 acquires the thickness of the commodity exhibited at a predetermined position. Here, the thickness of the commodity is a distance in the depth direction when the commodity is exhibited on the shelf 100.

The thickness of the commodity may be included in the shelf label information. In this case, the processor 11 acquires the thickness of the commodity with reference to the shelf label information. The processor 11 may acquire the thickness of the commodity from a database in which external dimensions of the commodity are stored. In this case, the database may be stored in the NVM 14 or the like, or may be stored in an external device.

When the thickness of the commodity is acquired, the processor 11 acquires a distance to the backmost side of the commodity line using the distance sensor 40.

When the distance to the backmost side of the commodity line is acquired, the processor 11 calculates the number of commodities based on the acquired distance. For example, the processor 11 acquires the thickness of the commodity and the distance to the backmost side of the commodity line. When the thickness of the commodity and the distance are acquired, the processor 11 calculates a length of the commodity line (the distance between the foremost side and the backmost side of the commodities) formed by the commodities based on the depth of the shelf stage and the distance. When the length of the commodity line is acquired, the processor 11 calculates the number of commodities (the number of commodities forming the commodity line) based on the length of the commodity line and the thickness of the commodity. When the processor 11 calculates the number of commodities, the processor 11 stores the calculated number of commodities as an initial value of the commodities. The processor 11 stores the initial value of the commodities similarly at each position.

The processor 11 has a function of determining whether the distance measured by the distance sensor 40 is changed.

That is, based on the distance measured by the distance sensor 40, the processor 11 determines whether the commodity is extracted or the commodity is added. For example, the processor 11 determines whether a difference between the distance measured by the distance sensor 40 and a moving average value or a previous measured value is greater than a predetermined threshold. When the processor 11 determines that the difference is greater than the predetermined threshold, the processor 11 determines that the distance has changed. Conversely, when the processor 11 determines that the difference is not greater than the predetermined threshold, the processor 11 determines that the distance has not changed.

The processor 11 has a function of determining whether a commodity indicated by the shelf label information is exhibited when the distance measured by the distance sensor 40 has changed.

When the distance measured by the distance sensor 40 has changed, the processor 11 calculates the length of the commodity line based on the distance after the change. The calculation of the length of the commodity line is described above.

When the processor 11 calculates the length of the commodity line, the processor 11 determines whether the thickness of the commodity indicated by the shelf label information matches the length of the commodity line. For example, the processor 11 determines whether the length of the commodity line is an integer multiple of the thickness of the commodity (or a difference between the length of the commodity line and the integer multiple of the thickness is equal to or less than a predetermined threshold). When the processor 11 determines that the length of the commodity line is the integer multiple of the thickness of the commodity, the processor 11 determines that the thickness of the commodity indicated by the shelf label information matches the length of the commodity line. When the processor 11 determines that the length of the commodity line is not the integer multiple of the thickness of the commodity, the processor 11 determines that the thickness of the commodity indicated by the shelf label information does not match the length of the commodity line.

When the processor 11 determines that the thickness of the commodity indicated by the shelf label information does not match the length of the commodity line, the processor 11 determines that the commodity indicated by the shelf label information is not exhibited.

Figure 4:
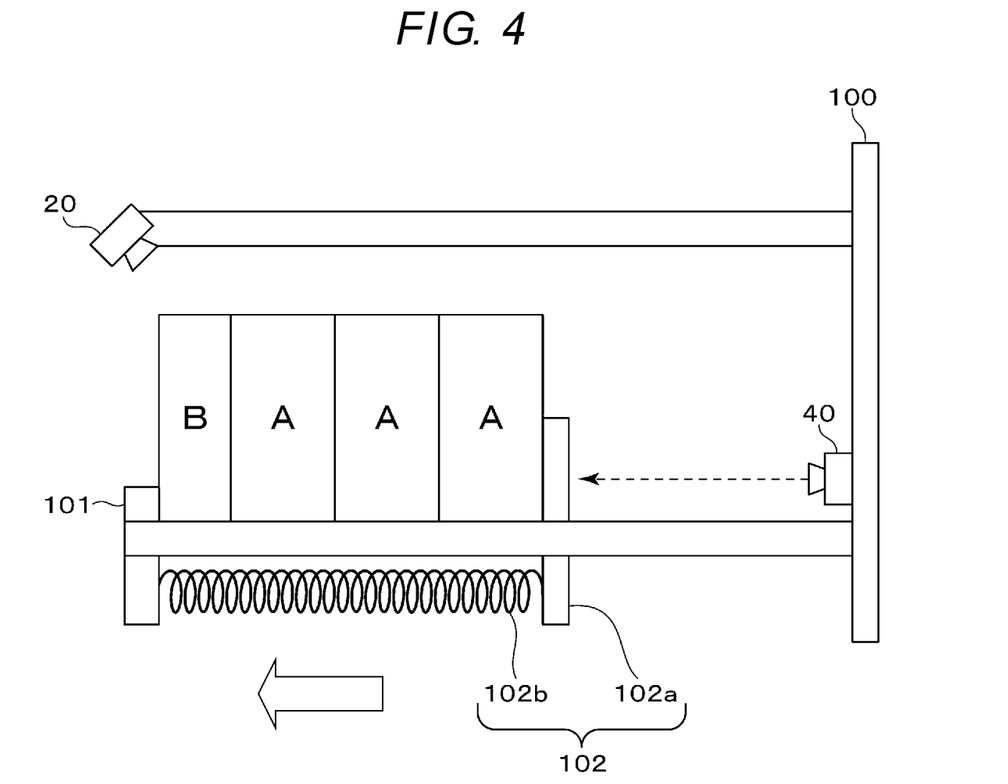
FIG. 4 is a diagram illustrating an operation of a management system, according to an example embodiment.

FIG. 4 illustrates an example in which the thickness of a commodity indicated by the shelf label information does not match a length of the commodity line. In the example illustrated in FIG. 4, the shelf label information is assumed to indicate the commodities A as the commodity exhibited at the position illustrated in FIG. 4. As illustrated in FIG. 4, the commodity B with the thickness different from the thickness of the commodity A is exhibited on the front side. In this case, the length of the commodity line is not the integer multiple of the thickness of the commodity A. Accordingly, the processor 11 determines that the thickness of the commodity indicated by the shelf label information does not match the length of the commodity line.

When the processor 11 determines that the thickness of the commodity indicated by the shelf label information matches the length of the commodity line, the processor 11 captures an image of the commodity on the foremost side using the camera 20. When the image of the commodity on the foremost side is captured, the processor 11 specifies the commodity on the foremost side based on the image captured through image processing.

For example, the NVM 14 stores dictionary information for specifying a commodity in advance. The dictionary information may indicate a feature point, a feature amount, or the like of each commodity. The dictionary information may indicate a network for specifying a commodity. The configuration of the dictionary information is not limited to a specific configuration. The processor 11 specifies a commodity shown in the captured image using the dictionary information.

When the commodity on the foremost side is specified, the processor 11 determines that the commodity indicated by the shelf label information is identical with the specified commodity. When the processor 11 determines that both the commodities are identical to each other, the processor 11 determines that the commodity indicated by the shelf label information is exhibited. Conversely, when the processor 11 determines that both the commodities are not identical to each other, the processor 11 determines that the commodity indicated by the shelf label information is not exhibited.

The processor 11 has a function of counting the increased or decreased number of commodities when the processor 11 determines that the commodity indicated by the shelf label information is exhibited.

When the processor 11 determines that the commodity indicated by the shelf label information is exhibited, the processor 11 calculates a difference between the distance before the change and the distance after the change. When the processor 11 calculates the difference, the processor 11 calculates a value obtained by dividing the calculated difference by the thickness of the commodity as the increased or decreased number of commodities. Here, when the distance after the change is longer than the distance before the change, the processor 11 determines that the number of commodities on the shelf stage is decreased (the commodity is extracted). When the distance after the change is shorter than the distance before the change, the processor 11 determines that the number of commodities on the shelf stage is increased (the commodity is added).

When the processor 11 calculates the increased or decreased number of commodities, the processor 11 calculates the number of current commodities. For example, the processor 11 calculates the number of current commodities based on the initial value of the commodities and the increased or decreased number of commodities. When the processor 11 calculates the number of current commodities, the processor 11 updates the initial value of the commodities to the calculated number of commodities.

The processor 11 may transmit the increased or decreased number of commodities to an external device through the communication unit 15 or the like.

The processor 11 has a function of outputting an error when the processor 11 determines that the commodity indicated by the shelf label information is not exhibited.

Here, the processor 11 displays the error on the electronic shelf label 30 through the shelf label interface 19. The processor 11 displays the error indicating that the exhibition of the commodity is wrong on the electronic shelf label 30 corresponding to a position at which the commodity indicated by the shelf label information is not exhibited. The processor 11 may display information indicating the commodity indicated by the shelf label information as the error.

The processor 11 may continue to output the error until the commodity indicated by the shelf label information is exhibited. For example, the processor 11 continues to display the error on the electronic shelf label 30 until the distance measured by the distance sensor 40 is identical with the distance before the change (or until the difference is equal to or less than the threshold).

The processor 11 may capture the image of the commodity and specify the commodity based on the image of the face of the commodity. In this case, the processor 11 may continuously output the error until the specified commodity is identical with the commodity indicated by the shelf label information.

Figure 5:
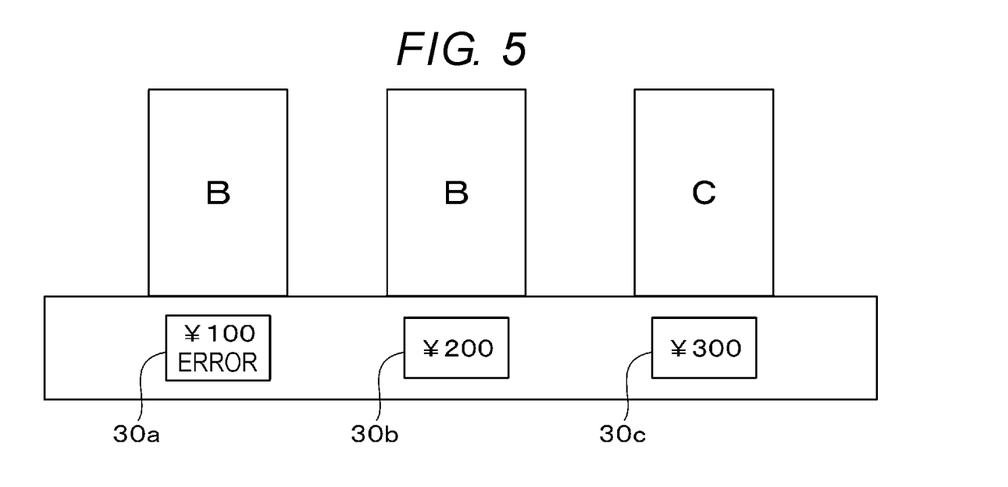
FIG. 5 is a diagram illustrating a display of electronic shelf labels, according to an example embodiment.

FIG. 5 is a diagram illustrating an example of an electronic shelf label 30 in which an error is displayed. FIG. 5 is a diagram when the shelf 100 is viewed on the front side. In the example illustrated in FIG. 5, the processor 11 determines that the commodity exhibited on the left is not identical with the commodity indicated by the shelf label information.

As illustrated in FIG. 5, the processor 11 displays an error on the electronic shelf label 30a corresponding to the commodity exhibited on the left.

The processor 11 may notify an external device of the error through the communication unit 15. The processor 11 may display the error on the display unit 17.

Figure 6:
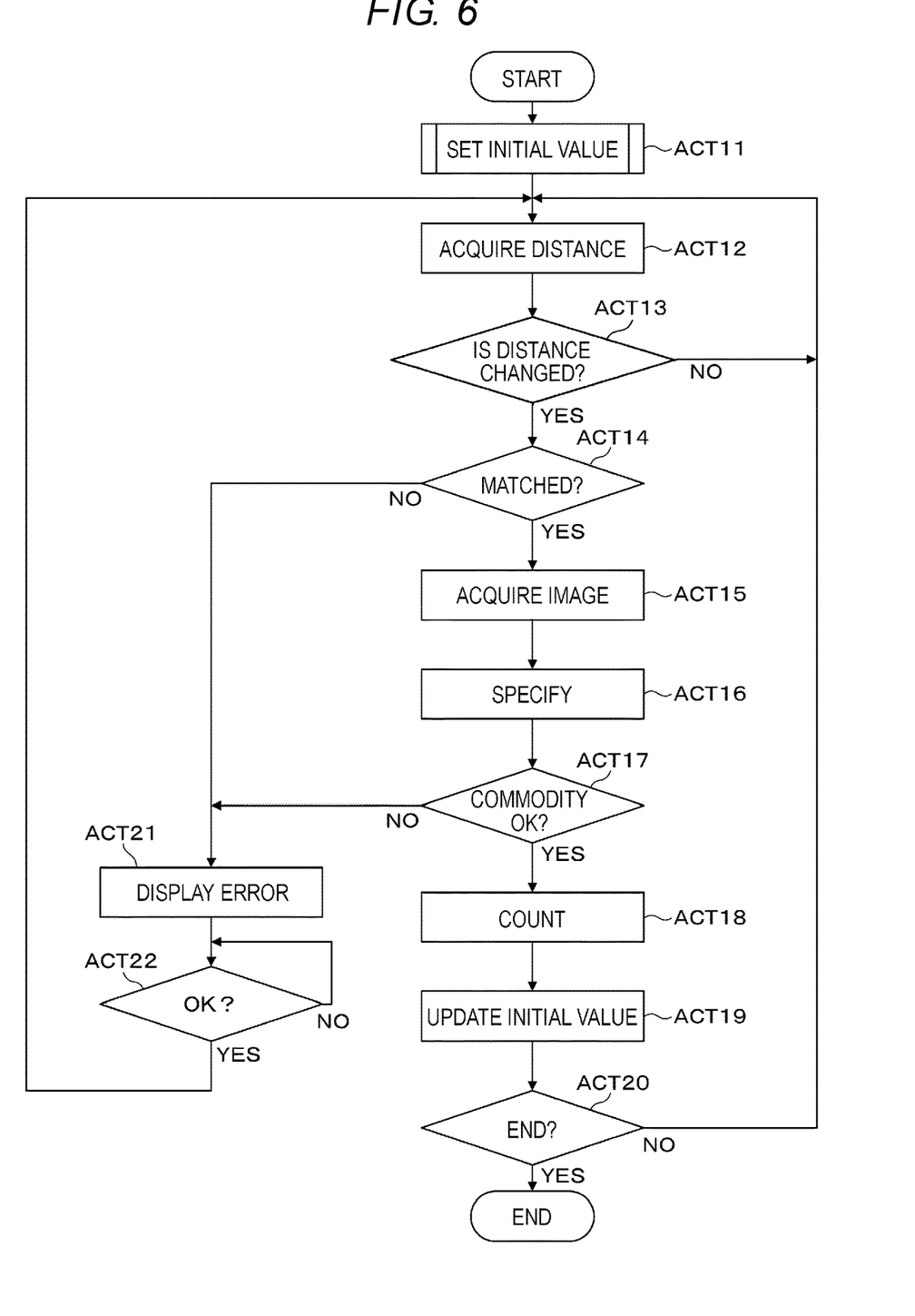
FIG. 6 is a flowchart illustrating an operation of the management device, according to an example embodiment.

Next, an operation example of the management device 10 will be described. FIG. 6 is a flowchart illustrating an operation example of the management device 10. Here, the user is assumed to complete the exhibition of the commodities on the shelf 100.

First, the processor 11 sets the number of exhibited commodities as the initial value at ACT11. When the initial value is set, the processor 11 measures a distance between the back plate to the backmost side of the commodity line using the distance sensor 40 at ACT12.

When the distance is measured, the processor 11 determines whether the distance is changed at ACT13. When the processor 11 determines that the distance is changed (e.g., YES at ACT13), the processor 11 determines whether the thickness of the commodity matches the length of the commodity line based on the distance after the change at ACT14.

When the processor 11 determines that the thickness of the commodity matches the length of the commodity line (e.g., YES at ACT14), the processor 11 acquires the image of the exhibited commodity using the camera 20 at ACT15. When the image is acquired, the processor 11 specifies the commodity shown in the image through image processing at ACT16.

When the commodity is specified, the processor 11 determines whether the specified commodity is identical with the commodity indicated by the shelf label information at ACT17. When the processor 11 determines that the specified commodity is identical with the commodity indicated by the shelf label information (e.g., YES at ACT17), the processor 11 calculates the increased or decreased number of commodities based on the distance before the change, the distance after the change, the thickness of the commodity, and the like at ACT18. When the processor 11 calculates the increased or decreased number of commodities, the processor 11 updates the initial value of the commodities based on the increased or decreased number of commodities at ACT19.

When the processor 11 updates the initial value of the commodities, the processor 11 determines whether the operation ends at ACT20 (e.g., determines whether or not the operation has ended). When the processor 11 determines that the distance is not changed (e.g., NO at ACT13) or determines whether the operation does not end (e.g., NO in ACT20), the processor 11 returns the process at ACT12.

When the processor 11 determines that the thickness of the commodity does not match the length of the commodity line (e.g., NO in ACT14) or determines that the specified commodity is not identical with the commodity indicated by the shelf label information (e.g., NO at ACT17), the processor 11 displays the error on the electronic shelf label 30 at ACT21.

When the processor 11 displays the error, the processor 11 determines whether the commodity indicated by the shelf label information is exhibited at ACT22. When the processor 11 determines that the commodity indicated by the shelf label information is not exhibited (e.g., NO at ACT22), the processor 11 returns the process at ACT22.

When the processor 11 determines that the commodity indicated by the shelf label information is exhibited (e.g., YES at ACT22), the processor 11 returns the process at ACT12. The processor 11 may end the display of the error.

Figure 7:
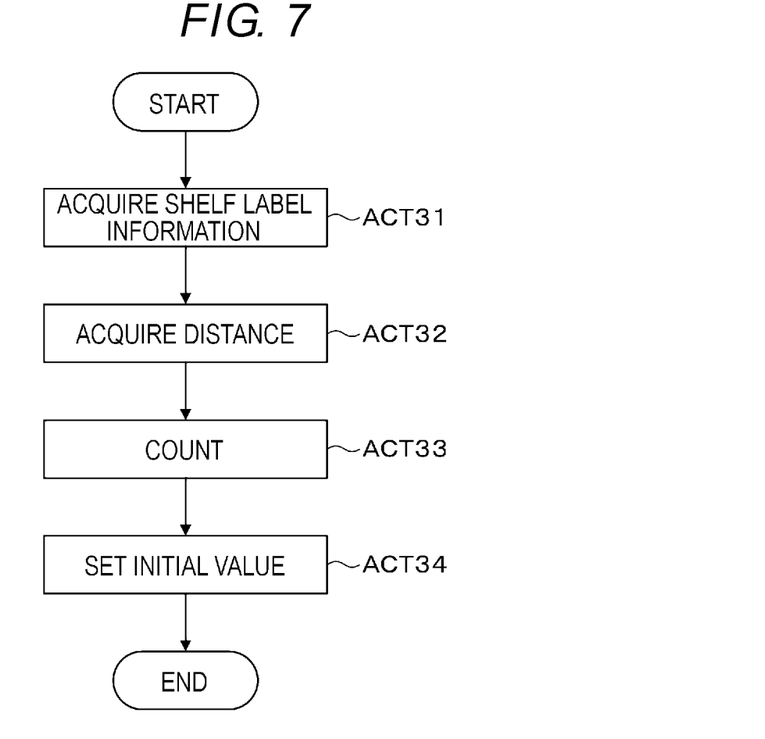
FIG. 7 is a flowchart illustrating an operation of the management device, according to an example embodiment.

Next, an example of the operation at ACT11 in which the processor 11 sets the number of exhibited commodities as the initial value will be described. FIG. 7 is a flowchart illustrating the example of the operation at ACT11 in which the processor 11 sets the number of exhibited commodities as an initial value.

First, the processor 11 acquires the shelf label information at ACT31. When the processor 11 acquires the shelf label information, the processor 11 acquires the distance between the back plate and the backmost side of the commodity line using the distance sensor 40 at ACT32.

When the processor 11 acquires the distance, the processor 11 calculates the number of commodities based on the thickness of the commodity indicated by the shelf label information, the acquired distance, and the like at ACT33. When the processor 11 calculates the number of commodities, the processor 11 sets the calculated number of commodities as the initial value at ACT34. When the processor 11 sets the initial value, the processor 11 ends the operation.

The processor 11 performs ACT11 to ACT22 and ACT31 to ACT34 at each position at which the commodity is exhibited.

The camera 20 may capture an image of a face of one commodity. The processor 11 may adjust the commodity based on the number of commodities extracted from the shelf 100.

The shelf stage of the shelf 100 may have a structure tilted to the front side. In this case, the shelf stage is a biasing mechanism.

The shelf stage may be a stage that includes a guide supporting the commodities from the lateral side so that the commodities are arranged in a predetermined direction.

The shelf 100 may include a relay device connected to the camera 20 and the distance sensor 40. In this case, the management device 10 is connected to the relay device.

Figure 8:
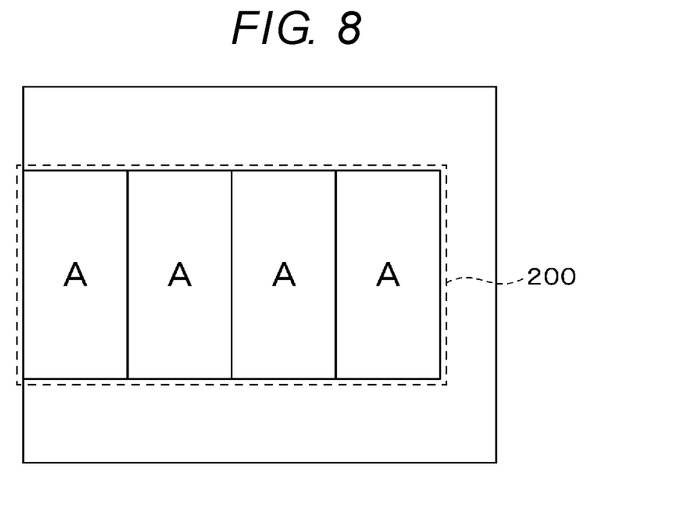
FIG. 8 is a diagram illustrating a modification of a camera, according to an example embodiment.

Next, a modification example of the camera 20 will be described. Here, the camera 20 captures an image of each commodity (for example, the upper surface of each commodity) that forms the commodity line. For example, the camera 20 is installed facing downwards in the middle of the shelf stage.

FIG. 8 illustrates an example of an image (e.g., a captured image) captured by the camera 20. In the example illustrated in FIG. 8, the camera 20 captures an image of the commodity line formed by four commodities A from the upper side.

The processor 11 specifies a commodity line area in which the commodity line is shown in the captured image. For example, the processor 11 estimates a size and a position of the area in which the commodity line is shown based on the thickness of the commodity indicated by the shelf label information and the number (e.g., the initial value) of commodities. The processor 11 specifies the commodity line area based on the estimated area. Here, the processor 11 specifies a commodity line area 200.

When the processor 11 specifies the commodity line area, the processor 11 specifies the commodity area in which each commodity is shown based on the number of commodities. That is, the processor 11 divides the commodity line area in the direction in which the commodities are arranged into the number of commodities and specifies each commodity area.

When the processor 11 specifies each commodity area, the processor 11 specifies the commodity in each commodity area. Through the operation, the processor 11 can determine that there is a mistake in the exhibition even when another commodity that has the same thickness is mixed in the commodity line. For example, the processor 11 may perform the foregoing operation after ACT19.

The management system that has the foregoing configuration measures the distance between the predetermined position and the backmost side of the commodity line. The management system calculates the increased or decreased number of commodities based on the distance before the change and the distance after the change when the distance is changed. As a result, the management system can efficiently calculate the increased or decreased number of commodities.

The management system determines whether the commodities indicated by the shelf label information are exhibited based on the distance after the change and the image of the face. As a result, the management system can determine whether the commodities are appropriately exhibited when the number of commodities is increased or decreased.

While certain embodiments have been described, these embodiments have been presented by way of example only, and are not intended to limit the scope of the inventions. Indeed, the novel embodiments described herein may be embodied in a variety of other forms. Furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A management device comprising:
   a distance sensor configured to measure a distance between a predetermined position and a backmost side of a commodity line, the commodity line having commodities biased in an arrangement direction and supported from a foremost side of the commodity line;
   a sensor interface configured to transmit and receive data to and from the distance sensor; and
   a processor configured to:
   calculate a length of the commodity line based on a distance before a change in distance is measured by the distance sensor and a distance after the change in distance is measured by the distance sensor when the distance is changed;
   determine whether the length of the commodity line matches a thickness of the commodity indicated by shelf label information; and
   calculate an increased or decreased number of commodities based on the length of the commodity line in response to a determination that the length of the commodity line matches the thickness of the commodity indicated by the shelf label information.

2. The device according to claim 1, further comprising:
   a camera interface configured to transmit and receive data to and from a camera that captures an image of the commodity,
   wherein the processor is configured to:
   cause the camera to capture the image after the change;
   specify a commodity of the commodity line based on the captured image; and
   calculate the increased or decreased number of commodities based on the length of the commodity line when the specified commodity is identical with the commodity indicated by the shelf label information.

3. The device according to claim 1, wherein the processor is configured to determine that the length of the commodity line matches the thickness of the commodity indicated by the shelf label information when the length of the commodity line is an integer multiple of the thickness of the commodity indicated by the shelf label information.

4. The device according to claim 1, further comprising:
a shelf label interface configured to transmit and receive an electronic shelf label and data,
wherein the processor is configured to display an error in the electronic shelf label in response to the determination that the length of the commodity line does not match the thickness of the commodity indicated by the shelf label information.

5. The device according to claim 1, further comprising a biasing mechanism configured to bias the commodities in the arrangement direction.

6. The device according to claim 1, further comprising a support mechanism configured to support the commodity line.

7. A management system comprising:
a biasing mechanism configured to bias commodities in an arrangement direction of the commodities;
a support mechanism configured to support a commodity line formed by the commodities from a foremost side of the commodity line;
a distance sensor configured to measure a distance between a predetermined position and a backmost side of the commodity line; and
a processor configured to:
calculate a length of the commodity line based on a distance before a change in distance is measured by the distance sensor and a distance after the change in distance, when the distance is changed;
determine whether a length of the commodity line matches a thickness of the commodity indicated by shelf label information;
and configured to calculate an increased or decreased number of commodities based on the determination as to whether the length of the commodity line matches the thickness of the commodity indicated by the shelf label information.

8. The management system of claim 7, further comprising a sensor interface configured to transmit and receive data to and from the distance sensor.

9. The management system of claim 7, further comprising:
a camera interface configured to transmit and receive data to and from a camera that captures an image of the commodity,
wherein the processor is configured to:
cause the camera to capture the image after the change;
specify a commodity of the commodity line based on the captured image; and
calculate the increased or decreased number of commodities based on the length of the commodity line when the specified commodity is identical with the commodity indicated by the shelf label information.

10. The management system of claim 7, wherein the processor is configured to determine that the length of the commodity line matches the thickness of the commodity indicated by the shelf label information when the length of the commodity line is an integer multiple of the thickness of the commodity indicated by the shelf label information.

11. The management system of claim 7, further comprising:
a shelf label interface configured to transmit and receive an electronic shelf label,
wherein the processor is configured to display an error in the electronic shelf label in response to the determination that the length of the commodity line does not match the thickness of one or more commodities indicated by the shelf label information.

12. A method of operating a management device, the method comprising:
setting a number of exhibited commodities as an initial value;
measuring a distance between a back plate to a side of a commodity line of the exhibited commodities via a distance sensor;
determining whether the distance is changed;
in response to determining that the distance is changed, determining (a) a distance after the change, and (b) whether a thickness of at least one of the commodities matches a length of the commodity line based on the distance after the change;
in response to determining the thickness of the commodity matches the length of the commodity line, acquiring an image of the exhibited commodity;
specifying the commodity shown in the image via image processing;
determining whether the specified commodity matches a commodity indicated by shelf label information; and
in response to determining the specified commodity matches the commodity indicated by the shelf label information, calculating an increased or decreased number of commodities based on at least one of the distance before the change or the distance after the change.

13. The method of claim 12, further comprising displaying an error on an electronic shelf label in response to determining at least one of (1) the thickness of the commodity does not match the length of the commodity line or (2) the specified commodity is not identical with the commodity indicated by the shelf label information.

14. The method of claim 13, further comprising:
determining that the commodity indicated by the shelf label information is exhibited; and
ending the display of the error.

15. The method of claim 12, further comprising updating the initial value of the commodities based on the increased or decreased number of commodities.

16. The method of claim 15, further comprising, in response to updating the initial value of the commodities, determining whether the operation has ended.

* * * * *